United States Patent
Sreedhar et al.

(10) Patent No.: US 11,727,456 B2
(45) Date of Patent: Aug. 15, 2023

(54) GENERATING A QUOTE TO CASH SOLUTION

(71) Applicant: International Business Machines Corporation, Armonk, NY (US)

(72) Inventors: Vugranam C. Sreedhar, Yorktown Heights, NY (US); Saurabh Sinha, Danbury, CT (US); Tara Astigarraga, Fairport, NY (US); Kevin Wahlmeier, Raleigh, NC (US); Shu Tao, Irvington, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 386 days.

(21) Appl. No.: 16/157,713

(22) Filed: Oct. 11, 2018

(65) Prior Publication Data

US 2020/0118186 A1    Apr. 16, 2020

(51) Int. Cl.
 *G06Q 30/00*   (2023.01)
 *G06Q 30/06*   (2023.01)
 *G06F 16/25*   (2019.01)

(52) U.S. Cl.
 CPC .......... *G06Q 30/06* (2013.01); *G06F 16/254* (2019.01)

(58) Field of Classification Search
 CPC ..... G06Q 30/0601–0645; G06Q 30/00; G06Q 30/0633; G06Q 30/0641
 USPC ............................................... 705/26.1–27.2
 See application file for complete search history.

(56) References Cited

U.S. PATENT DOCUMENTS

| | | | |
|---|---|---|---|
| 6,731,788 B1* | 5/2004 | Agnihotri | G11B 27/28 382/165 |
| 8,458,053 B1* | 6/2013 | Buron | H04N 21/4316 705/26.1 |
| 8,660,912 B1* | 2/2014 | Dandekar | G06Q 30/02 705/26.1 |
| 8,943,461 B2 | 1/2015 | Patrascu et al. | |
| 2007/0050406 A1* | 3/2007 | Byers | G06F 16/48 |
| 2007/0106570 A1* | 5/2007 | Hartman | G06Q 30/0633 705/26.8 |
| 2007/0294240 A1* | 12/2007 | Steele | G06F 16/951 707/999.005 |

(Continued)

OTHER PUBLICATIONS

Hu, Wen, Zhipeng Fan, and Ye Gao. "Research on smart contract optimization method on blockchain." IT Professional 21.5 (2019): 33-38. (Year: 2019).*

(Continued)

*Primary Examiner* — Christopher B Seibert
(74) *Attorney, Agent, or Firm* — Amin, Turocy & Watson, LLP

(57) ABSTRACT

Systems, computer-implemented methods and/or computer program products that facilitate generating code for template specification in a quote to cash (Q2C) solution are provided. In one embodiment, a computer-implemented method comprises: generating, by a system operatively coupled to a processor, a data model by specifying from a universal template which fields and attributes to include in the data model; mapping, by the system, external data into the data model; and generating, by the system, a code for template specification based on the data model, one or more business rules and a first code template.

20 Claims, 10 Drawing Sheets

(56) References Cited

U.S. PATENT DOCUMENTS

| | | | |
|---|---|---|---|
| 2008/0167946 A1* | 7/2008 | Bezos | G06Q 30/0214 705/26.1 |
| 2009/0012886 A1* | 1/2009 | Allin | G06Q 30/04 705/34 |
| 2009/0037291 A1* | 2/2009 | Dawson | G06Q 30/0603 705/27.2 |
| 2010/0114654 A1* | 5/2010 | Lukose | G06Q 30/0256 705/14.54 |
| 2012/0136756 A1* | 5/2012 | Jitkoff | G06F 16/9577 715/224 |
| 2012/0233020 A1* | 9/2012 | Eberstadt | G06Q 30/06 705/26.1 |
| 2013/0013427 A1* | 1/2013 | Gonsalves | G06Q 30/02 705/27.1 |
| 2014/0006232 A1* | 1/2014 | Viehweger | G06Q 40/12 705/30 |
| 2014/0025521 A1* | 1/2014 | Alsina | G06Q 30/0601 705/26.1 |
| 2014/0136990 A1* | 5/2014 | Gonnen | H04L 51/18 715/752 |
| 2014/0297537 A1* | 10/2014 | Kassemi | H04L 51/08 705/67 |
| 2015/0052061 A1* | 2/2015 | Anderson | G06Q 20/409 705/44 |
| 2015/0088686 A1* | 3/2015 | Glassberg | G06Q 50/01 705/26.8 |
| 2015/0095238 A1* | 4/2015 | Khan | G06Q 20/382 705/71 |
| 2015/0120479 A1 | 4/2015 | Bastien et al. | |
| 2015/0317698 A1* | 11/2015 | Kalyvas | G06Q 30/0214 705/14.66 |
| 2015/0324789 A1* | 11/2015 | Dvorak | H04L 63/0861 705/67 |
| 2017/0111220 A1 | 4/2017 | Kumar et al. | |
| 2018/0096406 A1 | 4/2018 | Krappe et al. | |
| 2019/0325044 A1* | 10/2019 | Gray | G06Q 20/3829 |
| 2019/0327080 A1* | 10/2019 | Liu | H04L 9/0891 |

OTHER PUBLICATIONS

Ozercan, Halil Ibrahim, et al. "Realizing the potential of blockchain technologies in genomics." Genome research 28.9 (2018): 1255-1263. (Year: 2018).* apttus.com, "Apttus Changes Paradigm for Quote-to-Cash Automation with Patented Advancements in Configure Price Quote (CPQ)," Jun. 12, 2013, 5 pages.

Apttus, "The C-Suite Guide to the Middle Office," Last Accessed: Jul. 30, 2018, 19 pages.

en.wikipedia.org, "Quote to cash," Retrieved: Jul. 27, 2018, 1 page.

Mell, et al., "The NIST Definition of Cloud Computing," NIST Special Publication 800-145, Sep. 2011, 7 pages.

* cited by examiner

GENERATING A QUOTE TO CASH SOLUTION

BACKGROUND

The subject disclosure relates to facilitating generating a quote to cash (Q2C) solution.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate generating a quote to cash (Q2C) solution are provided.

According to one embodiment, a system is provided. The system can comprise a memory that stores computer executable components. The system can also comprise a processor, operably coupled to the memory, and that can execute computer executable components stored in the memory. The computer executable components can comprise a modeling component that generates a data model by specifying from a universal template which fields and attributes to include in the data model. The computer executable components can further comprise a mapping component that maps external data into the data model. The computer executable components can further comprise a solution component that generates a code for template specification based on the data model, one or more business rules and a first code template.

According to another embodiment, a computer-implemented method is provided. The computer-implemented method can comprise generating, by a system operatively coupled to a processor, a data model by specifying from a universal template which fields and attributes to include in the data model. The computer-implemented method can further comprise mapping, by the system, external data into the data model. The computer-implemented method can further comprise generating, by the system, a code for template specification based on the data model, one or more business rules and a first code template.

According to another embodiment, a computer program product for facilitating generating a quote to cash (Q2C) solution is provided. The computer program product can comprise a computer readable storage medium having program instructions embodied therewith. The program instructions can be executable by a processor to cause the processor to generate a data model by specifying from a universal template which fields and attributes to include in the data model. The program instructions can further be executable by a processor to cause the processor to map external data into the data model. The program instructions can further be executable by a processor to cause the processor to generate a code for template specification based on the data model, one or more business rules and a first code template.

DETAILED DESCRIPTION

Figure 1:
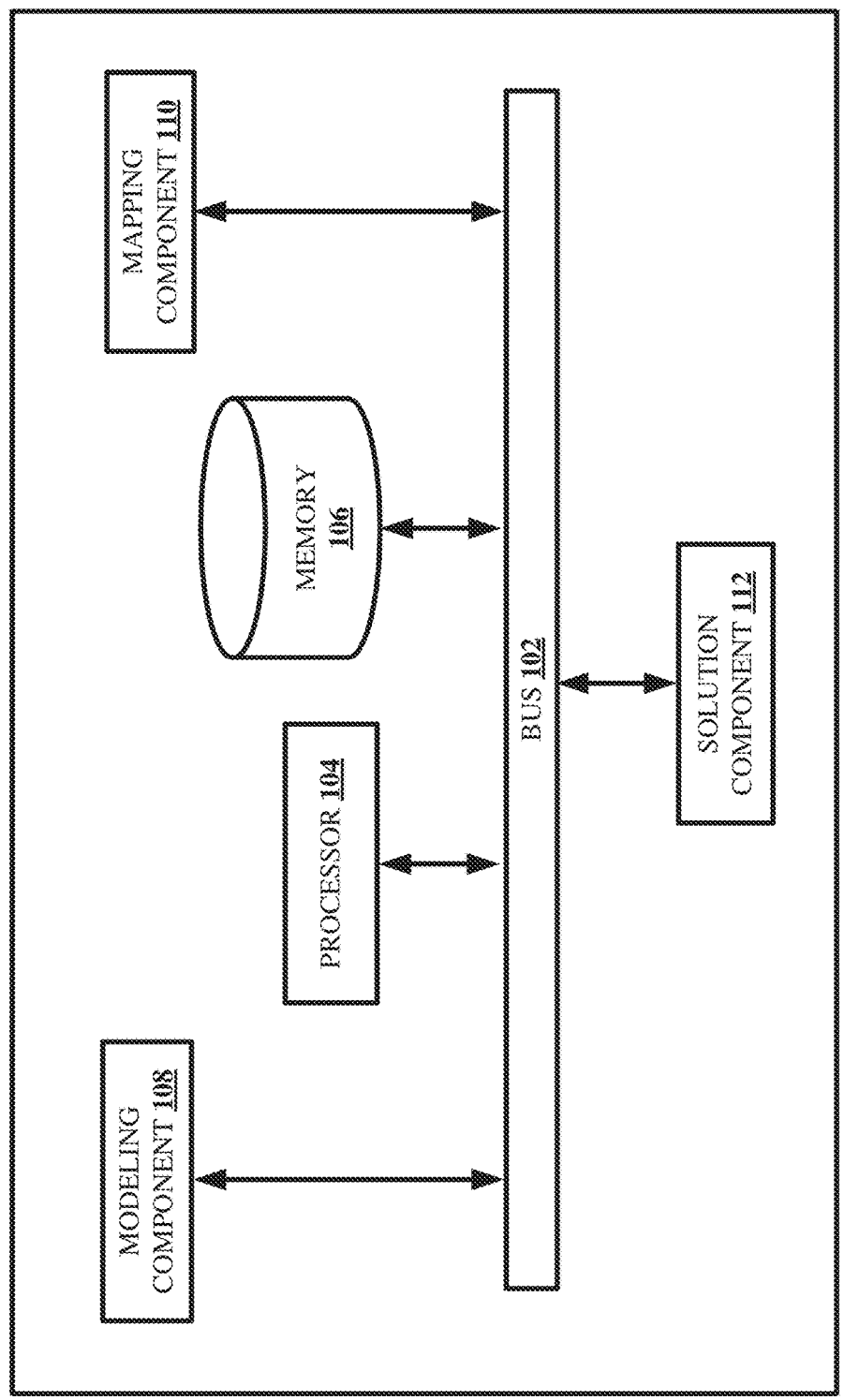
FIG. 1 illustrates a block diagram of an example, non-limiting system facilitating generating a Q2C solution in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Business contracts such as billing contracts and service management contracts can utilize a specialized team to work on every contract to figure out what is needed for that contract. The result can be a custom solution that can be time-consuming to build. This process can start from the beginning with every new contract. The embodiments described herein can streamline and automate these processes.

The biggest challenge in dealing with different vendors can be the shear scaling issue across thousands of clients. For example, consider a multivendor support services (MVSS) that can require signing contracts across different original equipment manufacturers (OEMs) to provide them with technical support services (TSS) such as fixing laptops to fixing automated teller machines (ATMs). Current approach can require developing one solution per client, which can take more than six months to on-board a client in delivering services. Going from pricing to contracting to signing to fulfilling order to invoicing to revenue management can take a long time. The embodiments described herein can facilitate generating a Q2C solution to solve this scaling issue and provide friction-less on-boarding of new clients.

One or more embodiments described herein can facilitate generating a Q2C solution. The embodiments described herein can allow for continual customization of the template specification. A completed template specification can be used with a code template to create customized client solution (e.g., generated codes) based on business rules (e.g., one or more business rules), which can be deployed to create a Q2C solution. More specifically, the embodiments described herein can generate a client data model (e.g., data model) by specifying from a given universal data model template (e.g., universal template) fields or attributes to include in the data model. Tags can be used to annotate or decorate the data model. External data sources can also be specified to be used within the generated Q2C solution. For example, external data sources (e.g., schema, table, columns, etc.) can be mapped into the client data model using extract, transform, load (ETL) rules written in the user interface (UI) using controlled template rules language that allows auto-complete and syntax checking from the customized data model or annotated data models. The controlled template rules language can also be used to generate business rules in the UI to allow for auto-complete and syntax checking from the data model. The generated business rules can be scheduled for execution. Code for client billing system can be generated using code template and annotated models. The generated code can include UI, services, rules (e.g., business rules), containers and everything needed to deploy the client solution to form a Q2C solution.

One or more embodiments described herein can facilitate specifying and selecting of key criteria based on templates, generating of Q2C container images, deploying Q2C images on container cluster and using the Q2C running system (e.g., Q2C solution). These templates can be a set of defined models called universal data model (UDM) or universal data model template or universal template. As used herein, the terms "universal data model or UDM," "universal data model template" and "universal template" can be used interchangeably. The UDM or universal template can include a set of dimensional models (DimMods) or entities. A DimMod can include two parts. A DimMod can include a set of fields that are relevant for that DimMod and a set of decorators (e.g., tags or attributes) for the fields.

For example, the universal template can comprise of a set of DimMods or entities that can be selected or specified by a user to customize a client data model or data model. As used herein, a user can be any type of entity such as a machine. As used herein, the term "client data model" and "data model" can be used interchangeably to mean a data model that has been specified or customized from a universal template to meet the needs of the client or the user. DimMods can comprise dimension tables and fact tables. Examples of DimMods can be contract information, customer information, client information, product information, rate information, etc. Fields within DimMods can be selected and annotated with tags (e.g., decorators or attributes). For example, if a user selected contract information (e.g., a DimMod), the fields for contract information can comprise contract identification (ID), signature date, effective start date, etc. The field signature date can be selected and annotated with tags to select whether it will be displayed in the generated billing user interface (UI), editable by the end user in the generated billing UI, etc. Fields can also be annotated with tags for renaming so that a rename value will be used in the generated billing UI in place of the original field name. For example, a user can change the name of the field signature date to date of signature. Fields can also be searched to go immediately to a field rather than selecting a DimMod then selecting a field within that DimMod. A field can also be annotated with a tag to be included in the bill that is generated, which can be pushed (e.g., broadcasted) to blockchain. A field that is annotated to be included in the generated bill can be an important field to be pushed to blockchain. It is appreciated that the generated client solution (e.g., generated code or code for template specification) can be deployed in environments with blockchain or in an environment without blockchain to form a Q2C solution. It is also appreciated that the generated client solution can also be deployed in containers or cloud environments.

The embodiments described herein can generate a Q2C full life cycle (e.g., pricing to invoicing) of a business contract. It can also link various phases of a contract providing tractability from quote to cash. Blockchain technology can be utilized in enabling Q2C. For many contracts, the embodiments described herein can generate a Q2C running system (e.g., Q2C solution) within an hour, which can otherwise take weeks or months causing contract scalability issues. For example, the embodiments described herein can generate a statement of work (SoW) template in an editable format such as Word document. The embodiments described herein can enable automatic code generation, enable contract scalability, simplify maintenance and decrease development or life-cycle costs and time to build custom solution for every engagement. In addition, the embodiments described here can improve accuracy and establish trust. For example, the embodiments described herein can generate business rules in the UI using controlled template rule language that allows auto-complete and syntax checking from the data model. Generated client solution (e.g., generated code or code for template specification) can be deployed in environments with blockchain to form a Q2C solution and establish trust.

The subject disclosure is directed to computer processing systems, computer-implemented methods, apparatus and/or computer program products that facilitate efficiently and automatically (e.g., without direct human involvement) generating a Q2C solution. The computer processing systems, computer-implemented methods, apparatus and/or computer program products employ hardware and/or software to solve problems that are highly technical in nature. FIG. 1 illustrates a block diagram of an example, non-limiting system 100 facilitating generating a Q2C solution in accordance with one or more embodiments described herein. Aspects of systems (e.g., non-limiting system 100 and the like), apparatuses or processes explained in this disclosure can constitute machine-executable components embodied within machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, the system 100 can be any type of component, machine, device, facility, apparatus, and/or instrument that comprises a processor. In some embodiments, the system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, the system 100 can comprise a bus 102, processor 104, memory 106, modeling component 108, mapping component 110 and/or solution component 112. The bus 102 can provide for interconnection of various components of the system 100. The processor 104 and memory 106 can carry out computation and/or storage operations of the system 100 as described herein. It is to be appreciated that in some embodiments one or more system components can communicate wirelessly with other components, through a direct wired connection or integrated on a chipset.

In various embodiments, the modeling component 108 can generate a data model by specifying from a universal template which fields and attributes (e.g., tags or decorators) to include in the data model. The universal template can comprise a set of DimMods (e.g., comprising dimension tables and fact tables) that can be selected to specify the data model. DimMods such as contract information, customer information, client information, product information, rate information, etc., can further contain fields that can be annotated with tags or decorators.

The modeling component 108 can utilize tags to annotate (e.g., decorate) the data model, or more specifically, to annotate the fields selected from the data model. Examples of fields within the contract information can comprise contract ID, signature date, effective start date, etc. Fields such as signature date can further be annotated with tags to select whether it will be displayed in the generated billing UI, whether it is editable by the end user in the generated billing UI, etc. The name of the fields can be changed by annotating with a tag for renaming so that a rename value will be used in the generated billing UI in place of the original field name. For example, a user can annotate the field signature date for renaming the field to date of signature. A user can also annotate a field to be included in the generated billing and pushed to blockchain.

The mapping component 110 can map external data into the data model. The mapping component 110 can also specify the external data or external data sources (e.g., schema, table, columns, etc.) to be mapped into the data model. The data can come from part of or the entire external data or schemas, tables, columns, etc. The mapping component 110 can specify, based on selection of a user, the external data to be mapped into the data model. The mapping component 110 can follow a pull model or a push model. The mapping component 110 can follow a pull model to initiate transaction or communication of data upon request, e.g., demand driven. A pull model can be defined as data being pulled or mapped (e.g., via the mapping component 110) into the data model on a scheduled basis based on data source specification. For example, data can be scheduled to be pulled from a data lake or data source tables based on query performed (e.g., pull all data from a determined data source table with close date within the past 3 days). Data that matches the query can be pulled or mapped into the data model via the mapping component 110. The mapping component 110 can also follow a push model to stream incoming data, e.g., data driven. A push model can be defined as data being pushed or mapped (e.g., via the mapping component 110) into the data model as the data become available from an external data source. For example, an application programming interface (API) can facilitate the pushing or mapping (e.g., via the mapping component 110) of data into the data model which can be invoked or initiated by the external data source. The mapping component 110 can use extract, transform, load (ETL) rules written in the user interface (UI) using controlled template rule language that allows auto-complete and syntax checking from the data model.

The solution component 112 can generate codes for template specification (e.g., client solution) based on the data model, business rules and a code template (e.g., first code template). More specifically, the solution component 112 can read the service specification from the data model generated by the modeling component 108 and use a code template to translate into generated codes for template specification based on written business rules. The generated codes for template specification can be based on the service specification from the data model so that the client solution can be built and deployed. The code generated can include UI, services, rules (e.g., business rules), containers and everything needed to deploy the client solution to form a Q2C solution. Furthermore, the generated codes for template specification based on the data model and the code template can be an executable code or a code template (e.g., second code template). Executable codes can be deployed to build the execution environment (e.g., Q2C solution).

Figure 2:
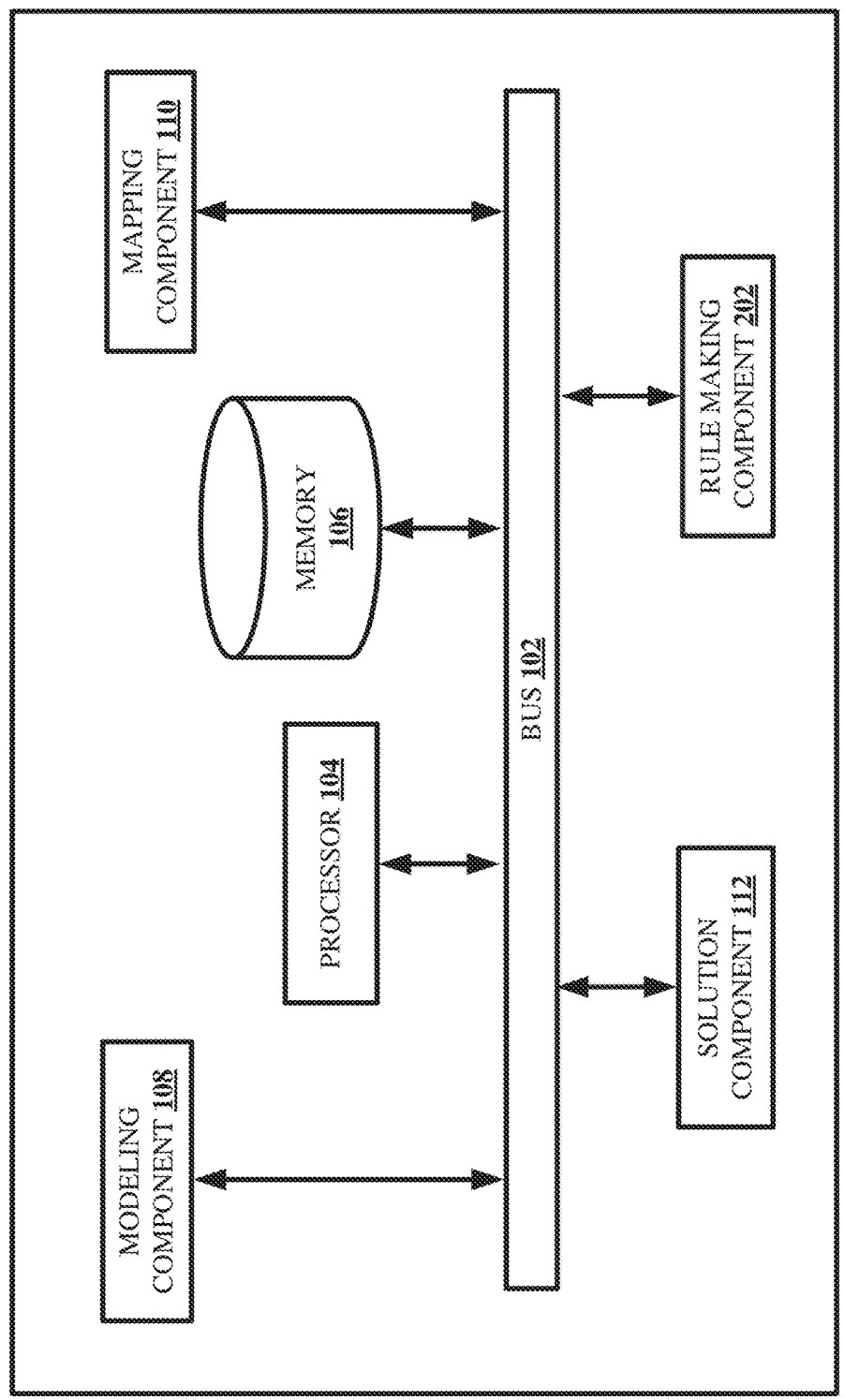
FIG. 2 illustrates a block diagram of an example, non-limiting system facilitating generating a Q2C solution including a rule making component in accordance with one or more embodiments described herein.

FIG. 2 illustrates a block diagram of an example, non-limiting system facilitating generating a Q2C solution including a rule making component 202 in accordance with one or more embodiments described herein. Repetitive description of like elements employed in other embodiments described herein is omitted for sake of brevity. The rule making component 202 can facilitate writing business rules and other rules by end-users. The rule making component 202 can generate business rules in the UI using controlled template rule language that allows auto-complete and syntax checking from the data model. The business rules can impose constraints within a field. For example, the business rules can state how billing items can be generated or validated. An example business rule can state that three pick-up-the-phone service billing items can be created per day, so if four pick-up-the-phone service calls were received on the same day, only three pick-up-the-phone service billing items can be created that day.

Figure 3:
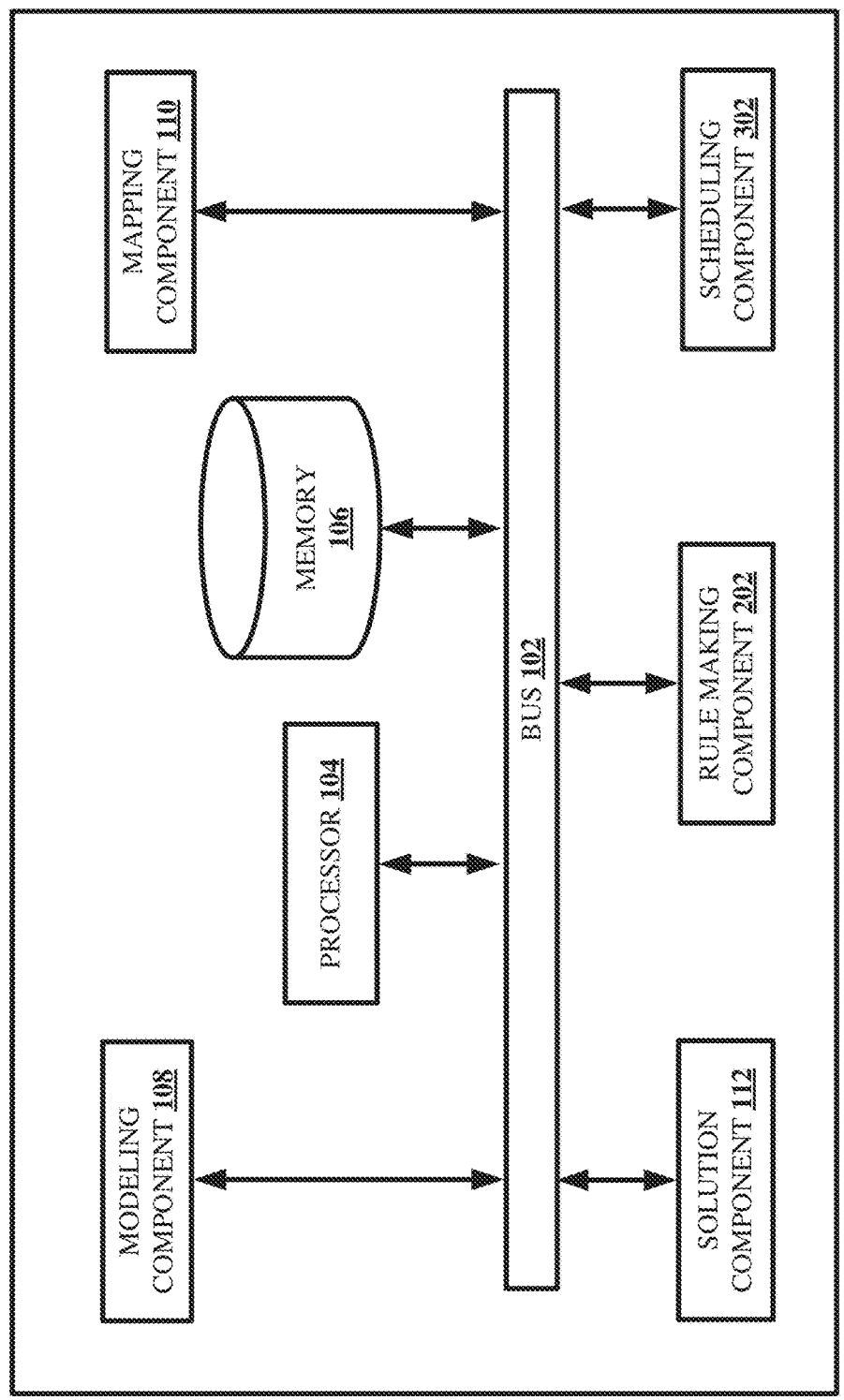
FIG. 3 illustrates a block diagram of an example, non-limiting system facilitating generating a Q2C solution including a scheduling component in accordance with one or more embodiments described herein.

FIG. 3 illustrates a block diagram of an example, non-limiting system facilitating generating a Q2C solution including a scheduling component 302 in accordance with one or more embodiments described herein. Repetitive description of like elements employed in other embodiments described herein is omitted for sake of brevity. The scheduling component 302 can schedule execution of the business rules. The scheduling component 302 can schedule how often to execute the one or more rules and under which conditions. For example, the scheduling component 302 can schedule how often data is pulled into the solution from a given data source or how often validation rules are invoked.

Figure 4:
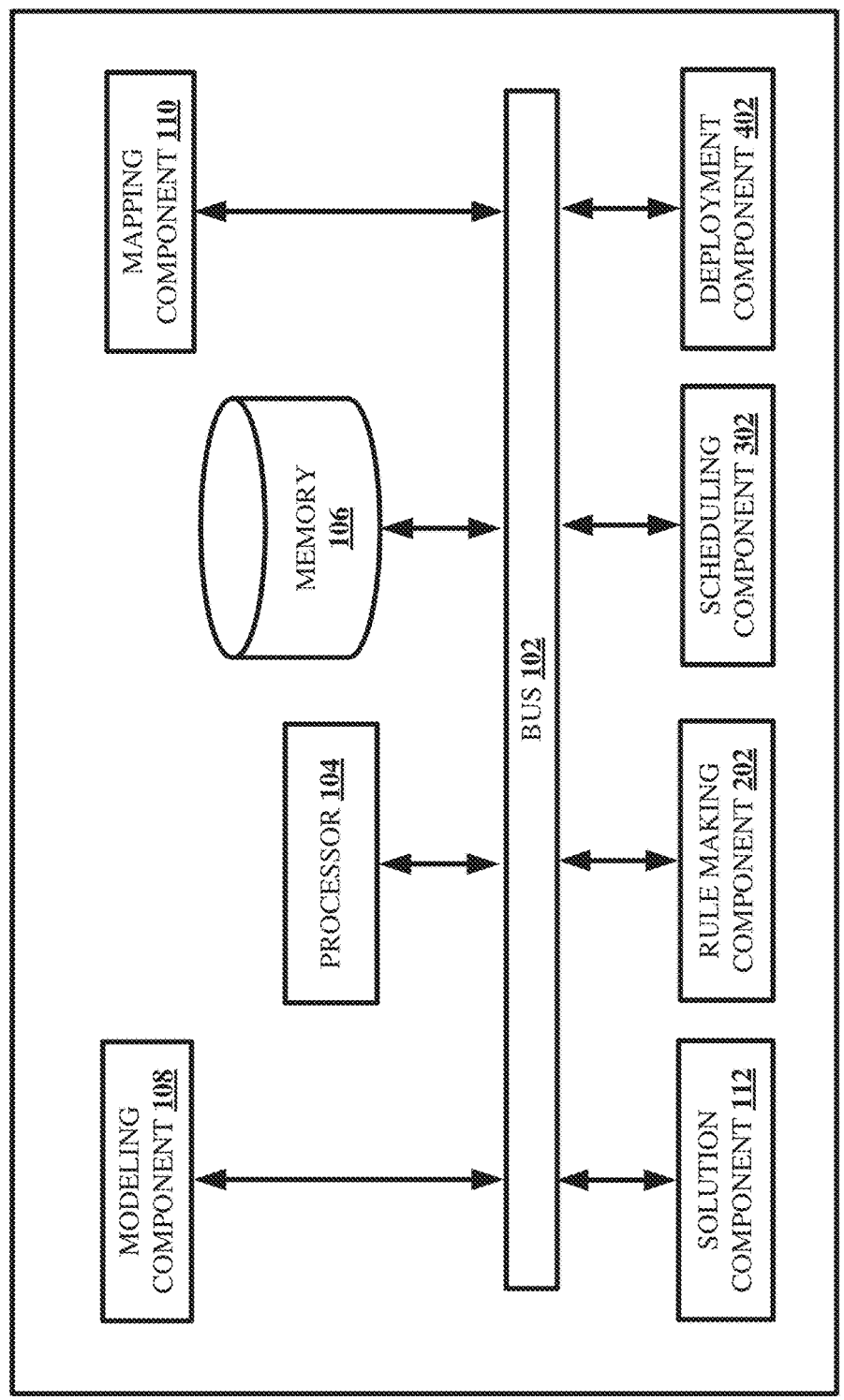
FIG. 4 illustrates a block diagram of an example, non-limiting system facilitating generating a Q2C solution including a deployment component in accordance with one or more embodiments described herein.

FIG. 4 illustrates a block diagram of an example, non-limiting system 100 facilitating generating a Q2C solution including a deployment component 402 in accordance with one or more embodiments described herein. Repetitive description of like elements employed in other embodiments described herein is omitted for sake of brevity. The deployment component 402 can execute the code for the template specification. The code generated by solution component 112 can include UI, services, rules (e.g., business rules), containers and everything needed to deploy the client solution to form a Q2C solution. Deployment can be in containers or cloud environments. The deployment component 402 can execute the code on blockchain. Deployment can be in an environment with blockchain or in an environment without blockchain. Deployment can comprise deploying or updating existing blockchain network (e.g., creating a new channel in an existing network.)

Figure 5:
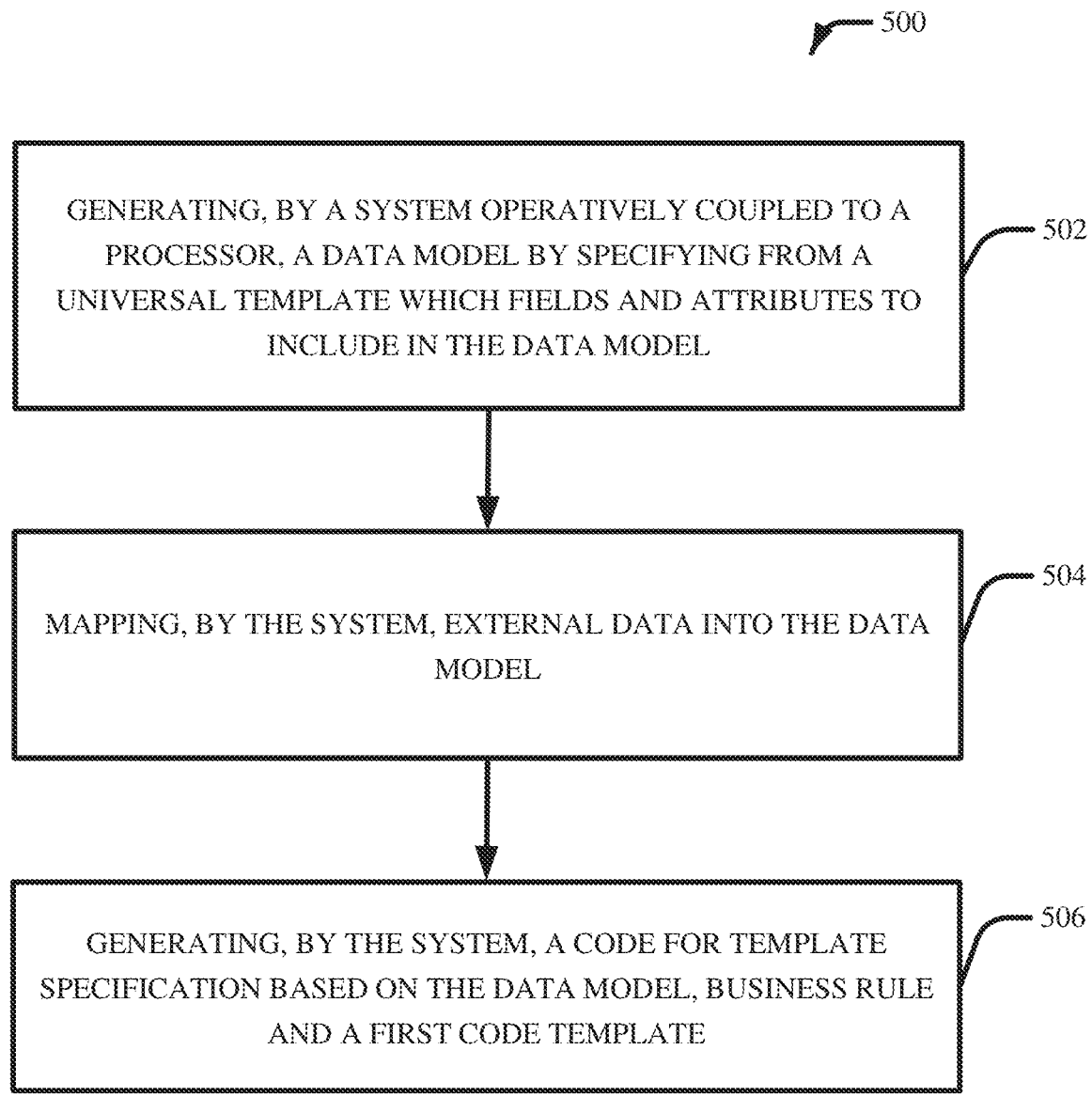
FIG. 5 illustrates a flow diagram of an example, non-limiting computer-implemented method facilitating generating a Q2C solution in accordance with one or more embodiments described herein.

FIG. 5 illustrates a flow diagram of an example, non-limiting computer-implemented method 500 facilitating generating a Q2C solution in accordance with one or more embodiments described herein. Repetitive description of like elements employed in other embodiments described herein is omitted for sake of brevity. At 502, the computer-implemented method 500 can comprise generating (e.g., via the modeling component 108), by the system 100 operatively coupled to a processor, a data model by specifying from a universal template which fields and attributes to include in the data model. At 504, the computer-implemented method 500 can comprise mapping (e.g., via the mapping component 110), by the system 100, external data into the data model. At 506, the computer-implemented method 500 can comprise generating (e.g., via the solution component 112), by the system 100, a code for template specification based on the data model, business rules and a first code template.

Figure 6:
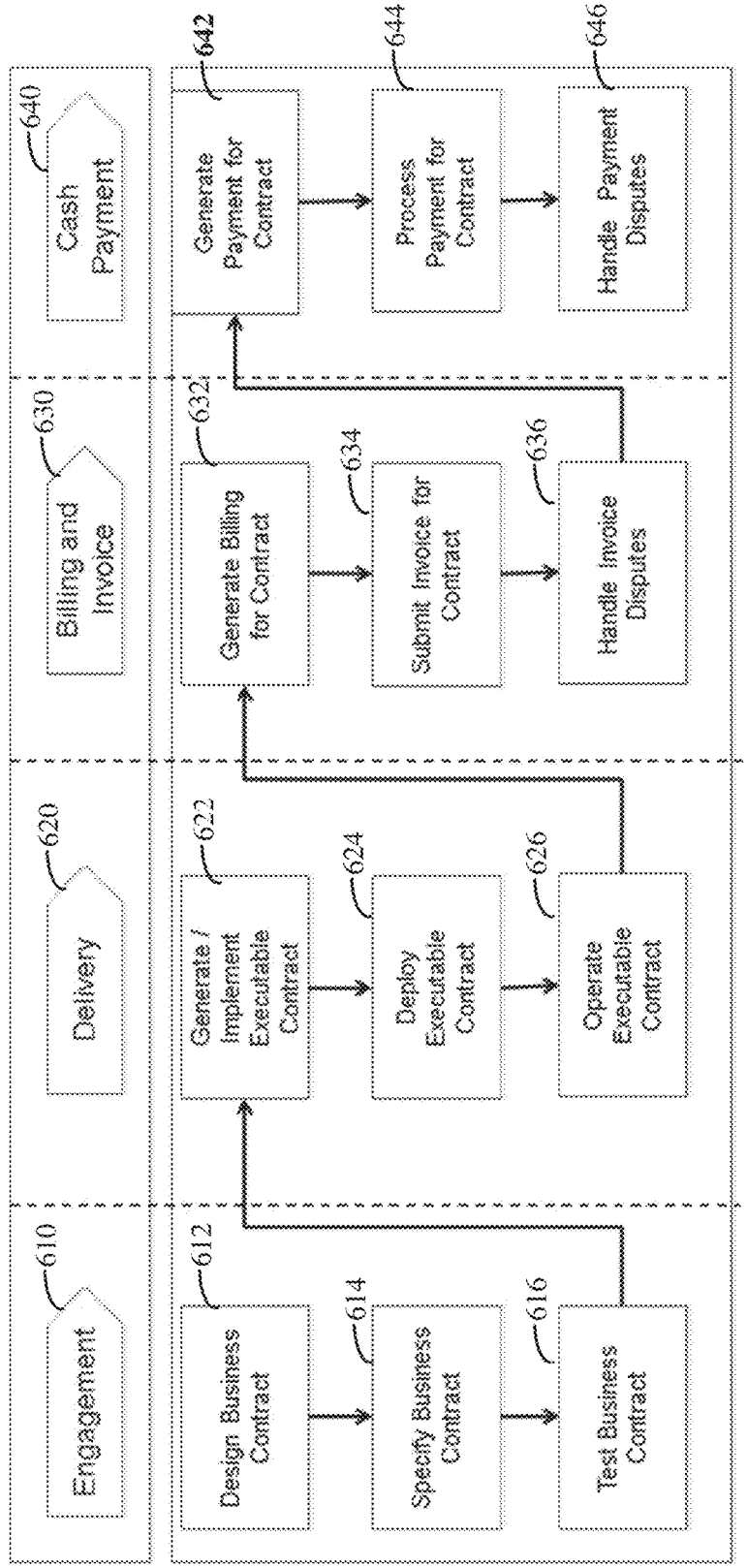
FIGS. 6 and 7 illustrate block diagrams of example, non-limiting systems facilitating generating a Q2C solution in accordance with one or more embodiments described herein.

FIG. 6 illustrates a block diagram of an example, non-limiting system 600 facilitating generating a Q2C solution in accordance with one or more embodiments described herein. Repetitive description of like elements employed in other embodiments described herein is omitted for sake of brevity. The system 600 can comprise engagement 610, delivery 620, billing and invoice 630 and cash payment 640. The engagement 610 (e.g., via the modeling component 108 and mapping component 110) can design business contract 612, specify business contract 614 and test business contract 616. The delivery 620 (e.g., via the solution component 112 and deployment component 402) can generate/implement executable contract 622, deploy executable contract 624 and operate executable contract 626. The billing and invoice 630 (e.g., via the deployment component 402) can generate billing for contract 632, submit invoice for contract 634 and handle invoice disputes 636. The cash payment 640 (e.g., via the deployment component 402) can generate payment for contract 642, process payment for contract 644 and handle payment disputes 646.

Figure 7:
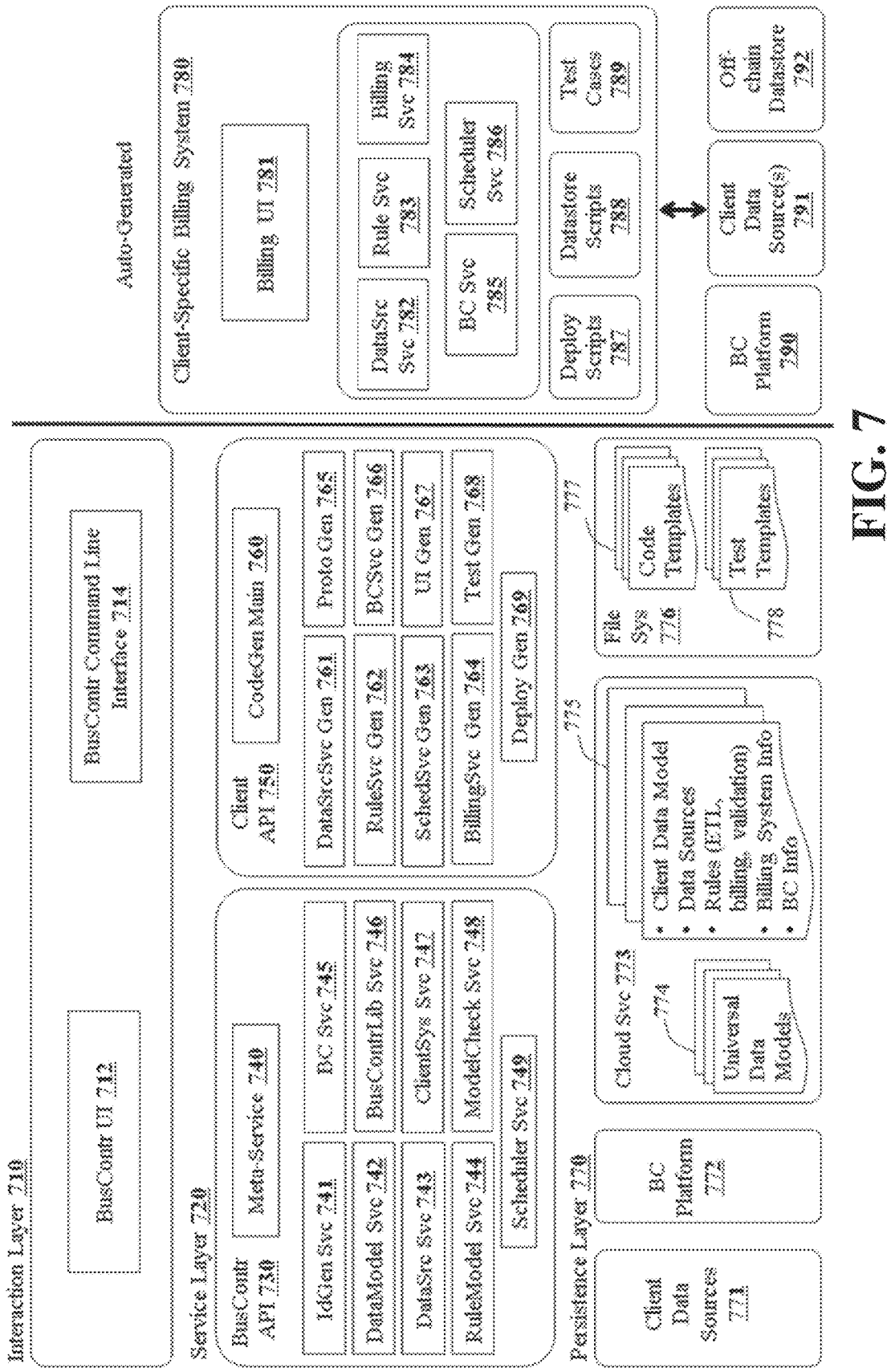

FIG. 7 illustrates a block diagram of an example, non-limiting system 700 facilitating generating a Q2C solution in accordance with one or more embodiments described herein. Repetitive description of like elements employed in other embodiments described herein is omitted for sake of brevity. The system 700 can be illustrated in a three-layer architecture that can comprise interaction layer 710 for data transmission, service layer 720 for implementing business logic thereby enforcing business rules and persistence layer 770 for storing persistent data. The system 700 with interaction layer 710, service layer 720 and persistence layer 770 can automatically generate client-specific billing system 780 (e.g., client solution, generated code, code for template specification, etc.).

The Interaction Layer 710 can comprise Business Contract UI 712 and Business Contract Command Line Interface 714. The Business Contract UI 712 can allow a user to specify the different contracts, e.g., specifying from a universal template which fields and attributes to include in the data model. The Business Contract Command Line Interface 714 can allow a developer to interact with the different components within the service layer 720. The Service Layer 720 can comprise Business Contract Application Programming Interface (API) 730 and Client API 750. The Business Contract API 730 (e.g., modeling component 108) can facilitate generating the business contract solution, rules specifications or data model. The Client API 750 (e.g., solution component 112) can facilitate generating the client solution (e.g., generated code, code for template specification, rules, etc.).

The Business Contract API 730 can comprise Meta-Service 740, Identification Generation Service 741, Data Model Service 742, Data Source Service 743, Rule Model Service 744, Blockchain Service 745, Business Contract Library Service 746, Client System Service 747, Model Check Service 748 and Scheduler Service 749. The Meta-Service 740 can be used to call the other services within the Business Contract API 730. The Identification Generation Service 741 can compose client identifications and related information for the contracts. The client identification can be utilized as a primary identification for solution generation (e.g., generating data model via the modeling component 108), code generation (e.g., generating code for template specification via the solution component 112) and deployment (e.g., via the deployment component 402).

The Data Model Service 742 (e.g., modeling component 108) can facilitate specifying the data model from the universal template (e.g., Universal Data Models 774). Fields within the data model can be selected and annotated with tags. The billing status can be an example field that can be selected. The billing status can be annotated with tags to indicate that it should be displayed in the UI, editable by the end-users, included in the generated bill, pushed or broadcasted on blockchain, etc.

The Data Source Service 743 (e.g., mapping component 110) can be used to specify where the data comes from. The Data Source Service 743 can also map external data (e.g., schemas, tables, columns, etc.) into the data model. The data can come from part of or the entire schemas, tables, columns, etc. The Data Source Service 743 can follow a pull model that initiates transaction or communication of data upon request, e.g., demand driven. The Data Source Service 743 can also follow a push model that streams incoming data, e.g., data driven.

The Rule Model Service 744 (e.g., rule making component 202) can facilitate writing business rules. End-users can write business rules and other rules with the facilitation of the Rule Model Service 744, e.g., generate business rule in the UI using controlled template rule language that allows auto-complete and syntax checking from the data model. The business rules can state how billing items can be generated and validated. As an example, the business rules can state the type of billing information to be created based on the service data in the service record. For example, the business rules can state that the pick-up-the-phone field is set to four so that four pick-up-the-phone service billing items can be created for calls received. If another rule states that while in another certain country, no more than three pick-up-the-phone service billing items can be created per day, even if four pick-up-the-phone service calls were received on the same day, only three pick-up-the-phone service billing items can be created that day.

The Scheduler Service 749 (e.g., scheduling component 302) can schedule execution of the business rules. The Scheduler Service 749 can schedule how often to execute the one or more business rules and under which conditions. The Blockchain Service 745 can determine what to push to blockchain, how often and based on which conditions. The Business Contract Library Service 746 can be described as a function library that is complimentary to the Rule Model Service 744. The Business Contract Library Service 746 can be a collection of different types of functions that are available. The types of functions available can be based on the business rules generated by the Rule Model Service 744. The Client System Service 747 can facilitate creating and generating the services used to generate the client solution. For example, Client System Service 747 can be a remote procedure call to request services, query access and update data.

The Model Check Service 748 can monitor relationships across different components for consistency check. For example, a field that is specified within the data model is also used in the business rules, if that field is deselected, the Model Check Service 748 can flag the associated dependencies that is going to break. So as an example, if a billing rule in the business rules uses a field but that field has been deselected, the deselection of that field should be reflected in that billing rule. The Model Check Service 748 can be described as a relationship checker across components.

The Client API 750 (e.g., via the solution component 112) can generate the associated codes for the template specification, e.g., client solution or Client-Specific Billing System 780, by using (e.g., reading) the service specification (e.g., data model via the Data Model Service 742) created in the Business Contract API 730 (e.g., via the modeling component 108), using the business rules (e.g., via the Rule Model Service 744 or rule making component 202) and filling in the Code Templates 777 to create the generated code which can be deployed (e.g., via the deployment component 402). The generated codes for template specification can include UI, services, rules (e.g., business rules), containers and everything needed to deploy the client solution to form a Q2C solution. The Client API 750 can comprise Code Generation Main 760, Data Source Service Generation 761, Rule Service Generation 762, Scheduler Service Generation 763, Billing Service Generation 764, Prototype Generation 765, Blockchain Service Generation 766, UI Generation 767, Test Generation 768 and Deployment Generation 769.

The Client API 750 can automatically generate the Client-Specific Billing System 780 (e.g., generated codes) with everything needed for deployment (e.g., via the deployment component 402). More specifically, in the Client API 750, Data Source Service Generation 761 can automatically generate Data Source Service 782, Rule Service Generation 762 can automatically generate Rule Service 783, Scheduler Service Generation 763 can automatically generate Scheduler Service 786, Billing Service Generation 764 can automatically generate Billing Service 784, Prototype Generation 765 can also automatically generate Billing Service 784, Blockchain Service Generation 766 can automatically generate Blockchain Service 785, UI Generation 767 can automatically generate Billing UI 781, Test Generation 768 can automatically generate Test Cases 789 and Deployment Generation 769 can automatically generate Deployment Scripts 787 and Datastore Scripts 788.

The Persistence Layer 770 can comprise Client Data Sources 771, Blockchain Platform 772, Cloud Service 773 and File System 776. The Cloud Service 773 can comprise Universal Data Models 774 and Documents 775, which can store client data model, data sources, rules (e.g., ETL, billing, validation, etc.), billing system information, and blockchain information. The File System 776 can comprise Code Templates 777 and Test Templates 778.

The Client-Specific Billing System 780 can be on Blockchain Platform 790 or Off-chain Datastore 792. The Client-Specific Billing System 780 can update or be updated by Client Data Source(s) 791.

Figure 8:
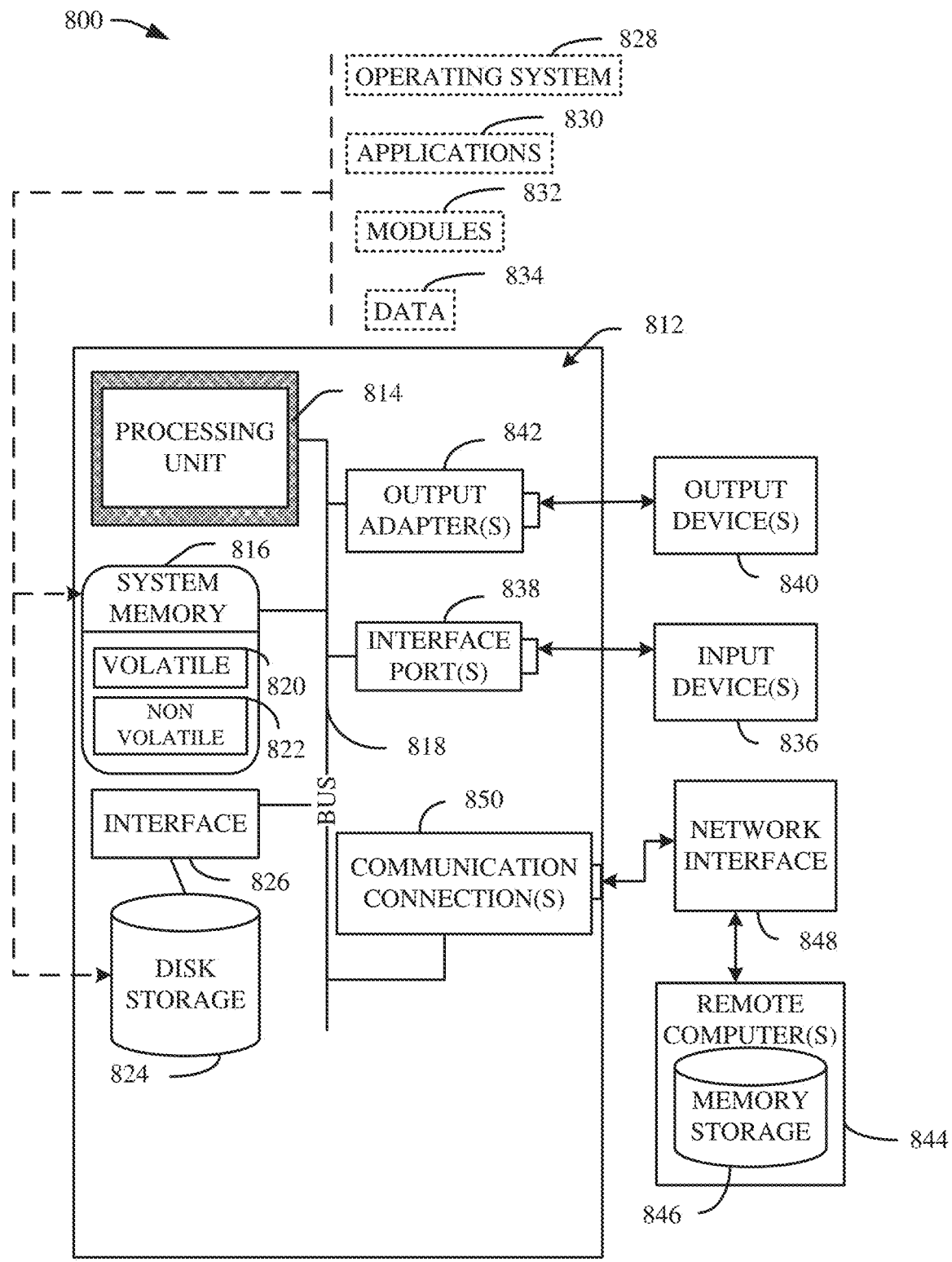
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
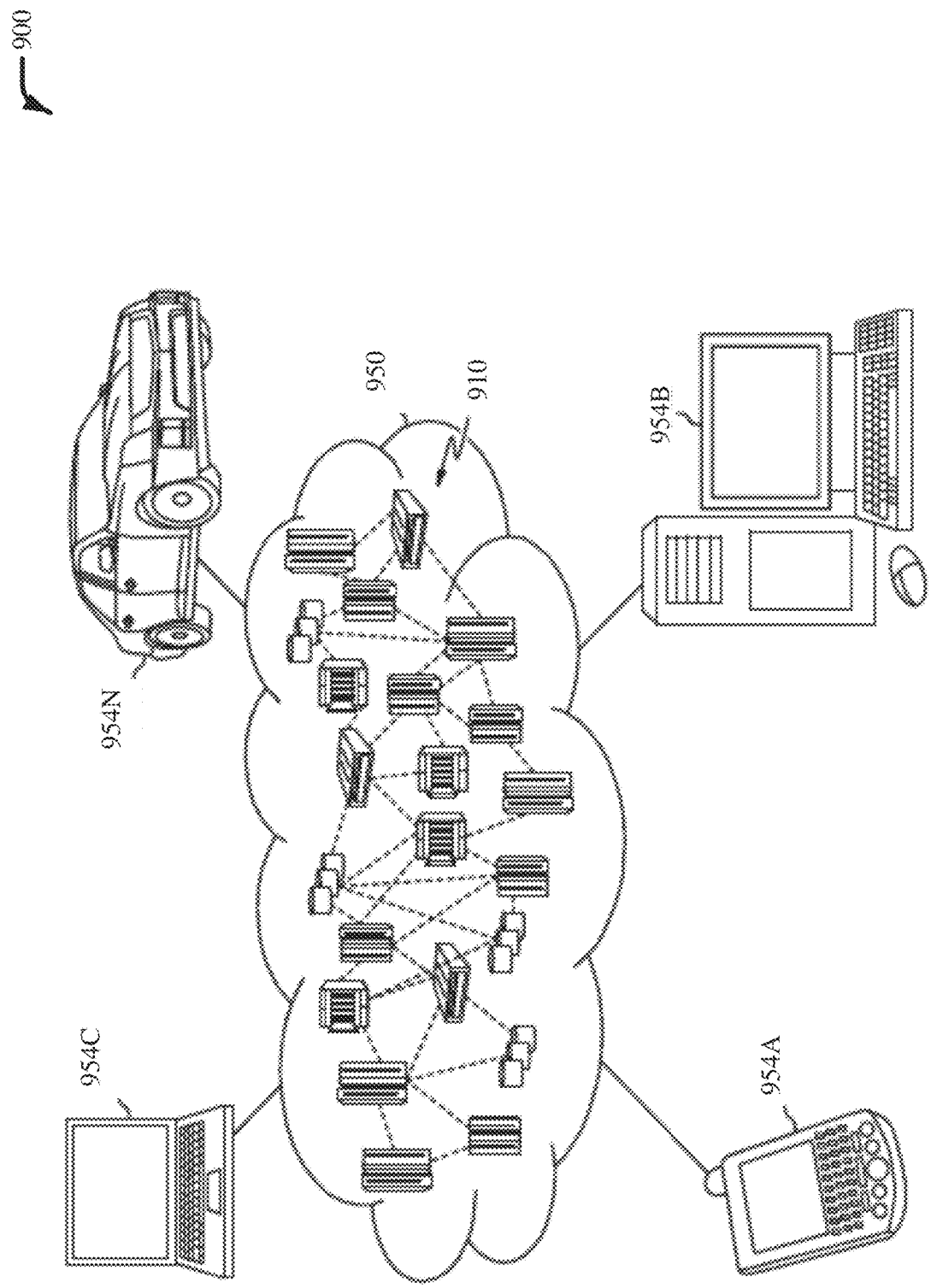
FIG. 9 illustrates a block diagram of an example, non-limiting cloud computing environment in accordance with one or more embodiments described herein.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
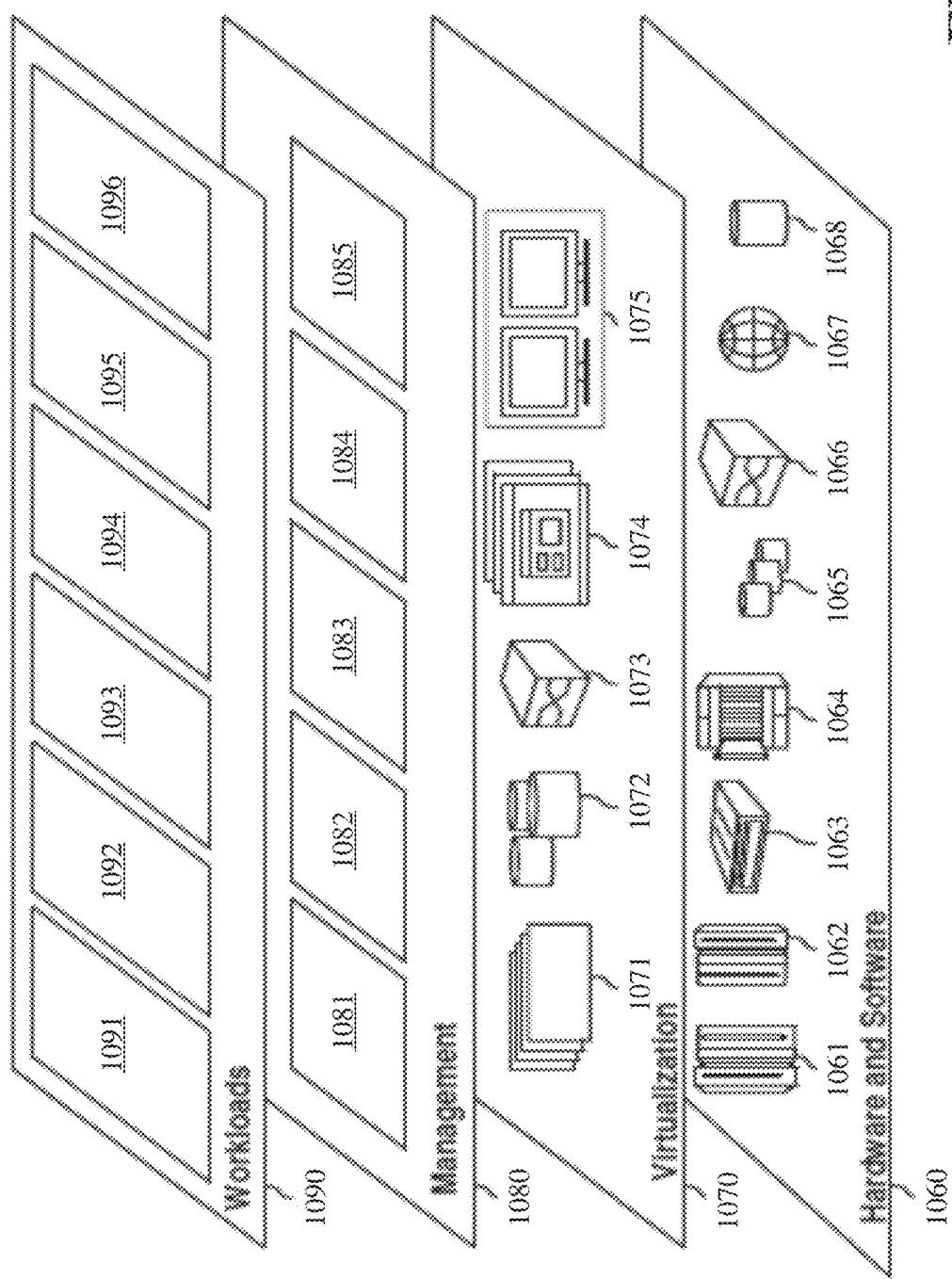
FIG. 10 illustrates a block diagram of example, non-limiting abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and mobile desktop 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes computer executable components stored in the memory, wherein the computer executable components comprise:
      a modeling component that:
         generates a data model by specifying from a universal template which fields and attributes to include in the data model; and
         annotates selected ones of the fields of the data model with tags that indicate whether the fields will be displayed in a generated billing user interface or whether the fields are editable by an end user in the generated billing user interface, and that indicate that the selected ones of the fields are to be pushed to a blockchain environment;
      a mapping component that maps external data into the data model;
      a solution component that:
         generates an executable code for template specification based on the data model, one or more business rules and a first code template; and
         generates a user interface employing the executable code; and
      a deployment component that:
         executes the executable code in the blockchain environment; and
         builds the execution environment based on executing the executable code.

2. The system of claim 1, wherein the modeling component also uses the tags to annotate the data model to identify ones of the fields to be included in the generated billing user interface and wherein the processor further comprises computer executable components that transmit the executable code over the Internet to a blockchain computer network.

3. The system of claim 1, wherein the mapping component also specifies the external data to be mapped into the data model.

4. The system of claim 1, wherein the mapping component uses extract, transform, load (ETL) rules written in user interface (UI) using controlled template rule language that allows auto-complete and syntax checking from the data model.

5. The system of claim 4, further comprising a rule making component that generates the one or more business rules in the UI using controlled template rule language that provides auto-complete and syntax checking from the data model.

6. The system of claim 5, further comprising a scheduling component that schedules how often to execute the one or more business rules and conditions under which to execute the one or more business rules.

7. The system of claim 1, wherein the executable code that is generated for template specification based on the data model and the first code template is a second code template, and wherein the generation of the executable code comprises generation of one or more software container images, and wherein the deployment component deploys the one or more software container images on a software container cluster.

8. The system of claim 1, wherein the deployment component further executes the executable code for the template specification, and wherein the deployment of the executable code is in a cloud environment.

9. The system of claim 8, wherein the deployment component further executes the executable code on blockchain and updates an existing blockchain network.

10. A computer-implemented method, comprising:
generating, by a computer system operatively coupled to a processor, a data model by specifying from a universal template which fields and attributes to include in the data model;
annotating, by the computer system, selected ones of the fields of the data model with tags that indicate that the selected ones of the fields are to be pushed to a blockchain environment;
mapping, by the computer system, external data into the data model;
automatically generating, by the computer system, a computer executable code for template specification based on the data model, one or more business rules and a first code template;
generating, by the computer system, one or more software container images based on the computer executable code; and
generating, by the computer system, a user interface (UI) employing the executable code.

11. The computer-implemented method of claim 10, wherein the mapping of the external data into the data model comprises using, by the computer system, extract, transform, load (ETL) rules written in the UI using controlled template rule language that allows auto-complete and syntax checking from the data model, and wherein the method further comprises deployment of the one or more software container images on a software container cluster.

12. The computer-implemented method of claim 11, further comprising generating, by the computer system, the one or more business rules in the UI using controlled template rule language that allows auto-complete and syntax checking from the data model.

13. The computer-implemented method of claim 12, further comprising a scheduling, by the computer system, execution of the one or more business rule, wherein the one or more business rules comprises how often data is pulled into the system from a defined data source and how often validation rules are invoked.

14. The computer-implemented method of claim 10, wherein the executable code that is automatically generated for template specification based on the data model and the first code template is a second code template.

15. The computer-implemented method of claim 10, further comprising executing, by the computer system, the code for the template specification.

16. A computer program product for facilitating generating code for template specification in quote to cash (Q2C) solution, the computer program product comprising a computer readable storage medium having program instructions embodied therewith, the program instructions executable by a processor to cause the processor to:
generate, by the processor, a data model by specifying from a universal template which fields and attributes to include in the data model;
map, by the processor, external data into the data model;
annotate, by the processor, with tags attached to selected ones of the fields of the data model to be transmitted to a blockchain network;
generate, by the processor, a code for template specification based on the data model, one or more business rules and a first code template;
generate, by the processor, a user interface employing the executable code; and
transmit, by the computer system, only the tagged selected fields of the fields to a blockchain network.

17. The computer program product of claim 16, wherein the program instructions are further executable to cause the processor to:
use extract, transform, load (ETL), by the processor, rules written in user interface (UI) using controlled template rule language that allows auto-complete and syntax checking from the data model.

18. The computer program product of claim 17, wherein the program instructions are further executable to cause the processor to:
generate, by the processor, the one or more business rules in the UI using controlled template rule language that allows auto-complete and syntax checking from the data model.

19. The computer program product of claim 18, wherein the program instructions are further executable to cause the processor to:
schedule, by the processor, execution of the one or more business rules.

20. The computer program product of claim 16, wherein the program instructions are further executable to cause the processor to:
execute, by the processor, the code for the template specification.

* * * * *